United States Patent [19]

McClure

[11] 4,221,127
[45] Sep. 9, 1980

[54] FLOW MONITORING

[76] Inventor: Charles A. McClure, 5 Laurel Cir., Malvern, Pa. 19355

[21] Appl. No.: 868,681

[22] Filed: Jan. 11, 1978

[51] Int. Cl.³ .............................................. G01F 1/52
[52] U.S. Cl. ...................................... 73/861; 364/510; 73/227
[58] Field of Search ...................... 73/194 R, 215, 227; 364/510

[56] References Cited

U.S. PATENT DOCUMENTS

| | | | |
|---|---|---|---|
| 1,492,829 | 5/1924 | Buckley | 73/227 |
| 3,638,490 | 2/1972 | Buettner | 73/194 R X |
| 3,681,988 | 8/1972 | McNulty | 73/194 R |
| 3,727,459 | 4/1973 | Buettner | 73/205 R |
| 3,866,028 | 2/1975 | Schontzler et al. | 73/215 X |
| 4,026,151 | 5/1977 | Fitzgerald | 73/194 R |
| 4,058,011 | 11/1977 | Martig | 73/194 R |

Primary Examiner—Jerry W. Myracle
Attorney, Agent, or Firm—Charles A. McClure

[57] ABSTRACT

Gravity flow of liquid in sewer pipes or similar conduits is determined in the absence of a weir, flume, or similar flow-rating device by sensing the depth of the liquid in the pipe, converting such depth to the corresponding rate of flow through the pipe in accordance with a known relationship of depth to flow and without performing any mental computation, and providing a readable indication of instantaneous flow rate, and/or optionally integrating the flow rate over time, recording such flow rate and/or the integrated flow, printing out one or the other, or both, etc. Apparatus for doing so includes a pressure sensor, a depth-to-flow converter, and usually a separate indicator/recorder. Unlike systems utilizing flumes or weirs, this apparatus and this method can accommodate sludge deposited in a pipe or other conduit to be monitored.

9 Claims, 4 Drawing Figures

FLOW MONITORING

This invention relates to monitoring gravity flow of liquid in sewer pipes or similar conduits without use of a weir, flume, or other flow-rating device.

Gravity flow of liquid in a pipe is a function of the inclination or slope and of the roughness of the inside of the pipe. The steeper the slope and the smoother the pipe, the greater the flow rate. In the absence of rapid changes in flow, the rate can be ascertained from the depth of liquid in the pipe by means of a known relationship of depth to flow. The Manning flow formula, which includes pipe roughness and slope is one such relationship. Of course, any given pipe in which gravity flow of liquid occurs may be calibrated empirically to provide a known depth-to-flow relationship, which may depart somewhat from that formula.

Notwithstanding some engineering knowledge of such depth-to-flow relationships for pipes, physical embodiment thereof for use in monitoring flow has been insufficiently realized. Yet advantages of convenience and dependability are within reach in equipment suitably designed to attain them without using weirs, flumes, and other flow-rating devices (e.g., submerged obstacles).

A primary object of the present invention is monitoring of flow in pipes via depth measurement without using a weir, flume, or other flow-rating device.

Another object of this invention is to provide apparatus for performing such monitoring of liquid flows, without requiring any mental computation, as in converting depth measurements to flow values.

A further object is depth-to-flow conversion apparatus for use in the absence of weirs, flumes, or other flow-rating devices.

Other objects of the present invention, together with means and methods for attaining the various objects, will be apparent from the following description and the accompanying diagrams of a physical embodiment thereof, which is presented by way of example rather than limitation.

In general, the objects of the present invention are accomplished by the steps of, first, physically embodying a known relationship, between depth of liquid in the pipe and liquid flow through the pipe, in a system for converting an input value of such depth to the corresponding value of such flow; next, sensing the depth of liquid in the pipe, in the absence of a weir, flume, or other flow-rating device; then inputting the sensed depth value to the conversion system and obtaining the corresponding output flow value, and providing a physical indication of such output flow value.

In apparatus terms this invention comprises means for monitoring gravity flow in a pipe without a weir, flume, or other flow-rating device, including a physical system adapted to receive input values of depth of liquid in the pipe and to output corresponding values of liquid flow through the pipe in accordance with a known relationship therebetween, means for sensing depth of liquid in the pipe and for transmitting the sensed depth to the input-output system, and means for translating the output therefrom into a flow indication.

More specifically, the invention utilizes depth to-flow conversion means designed in accordance with the Manning flow formula for circular pipes, or rectangular conduits, for example. It comprises flow-computing means receiving as inputs indications of pipe shape, size, slope, and roughness of the inside wall surface of the pipe, as well as a dimensional constant and the depth of sludge, if any. Satisfactory means for sensing depth in the practice of this invention are disclosed in Martig U.S. Pat. No. 3,965,740, which teaches a bubbler type of apparatus, including a portable sensor or probe, but other types of sensors for liquid pressure may be substituted with like result.

It will be understood that reference to gravity flow herein excludes forced flow, wherein the pipe no longer functions as an open channel but as part of a closed system, to which the present invention is not applicable.

Figure 1:
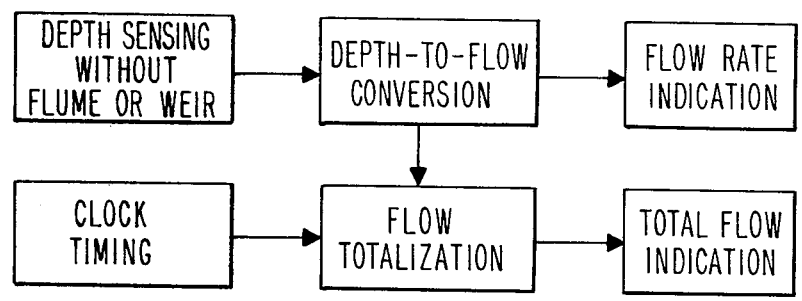
FIG. 1 is a block diagram of the liquid flow monitoring method of this invention.

FIG. 1 illustrates in flow schematic or block form, as sequential (indicated by arrows) steps in the method of the present invention, Depth Sensing Without Flume or Weir, Depth-to-Flow Conversion, and Flow Indication. An additional set of sequential steps is indicated as Clock Timing, Flow Totalization, and Total Flow Indication. The intermediate steps in the respective sequences are linked together by an arrow from Depth-to-Flow Conversion to Flow Totalization as an indication that the former precedes the latter. It will be understood that "Indication" may be accomplished without or preferably with the making of some record of the indication.

Figure 2:
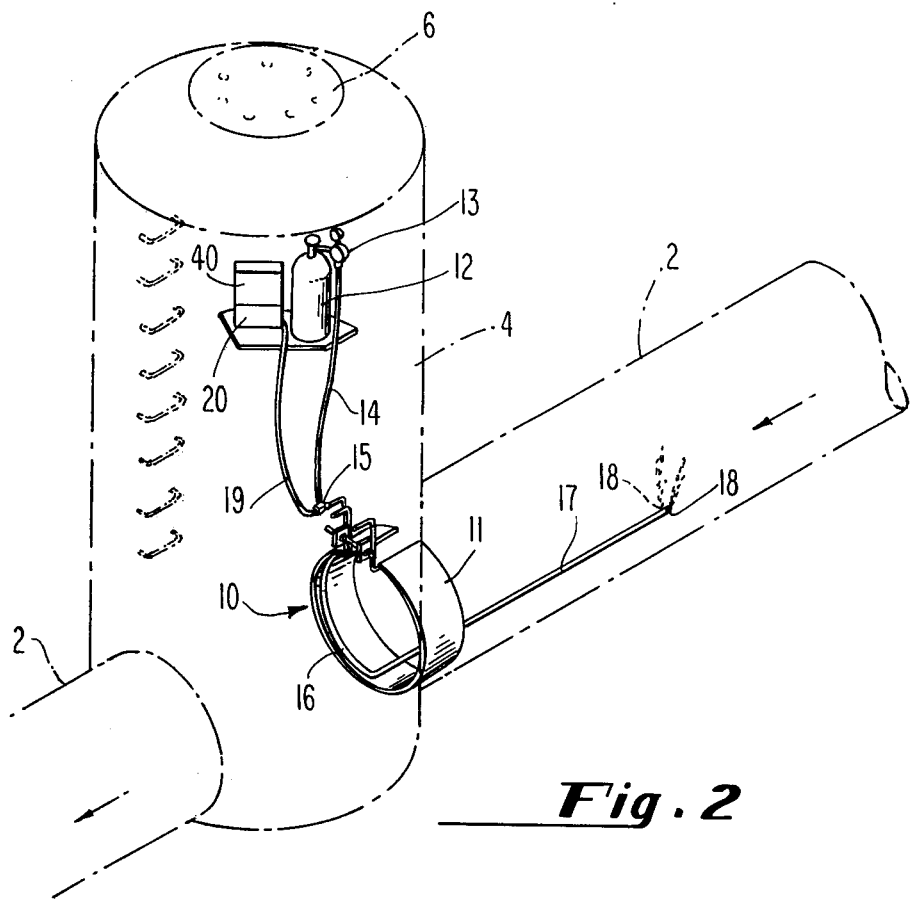
FIG. 2 is a largely schematic illustration of apparatus for practicing the method of FIG. 1.

FIG. 2 shows corresponding apparatus schematically: cylindrical pipe 2 with relatively small circular cross-section intersecting manhole 4 having relatively large circular cross-section and intermediate-sized circular cover 6, all shown in phantom. Pressure type of depth sensor 10 fits inside the end of the pipe opening into the manhole and has collar 11 expansible to retain it adjacent the inside wall thereof. Cylindrical container 12, shown on a shelf in the manhole, holds compressed air as a bubble source, and has pressure regulator 13 between it and pressure line 14, which connects to fitting 15 near the probe. Bubble tube 16 also connects to the same fitting and curves downward along the inside of collar 11 toward the lowest part thereof, which overlies the bed or invert of the pipe. Connecting bubble tube 17 extends upstream along the pipe invert, and has two laterally disposed outlet openings 18 near the end of the tube (which is closed upstream). The sensor is connected by static line 19 from fitting 15 to Depth-to-Flow Converter 20 (shown in block form in the view), which in turn is connected to Indicator/Recorder Unit 40 shown directly on top thereof here. The Converter and the Indicator/Recorder Unit appear in more detail in subsequent views, together with related elements of the apparatus.

Figure 3:
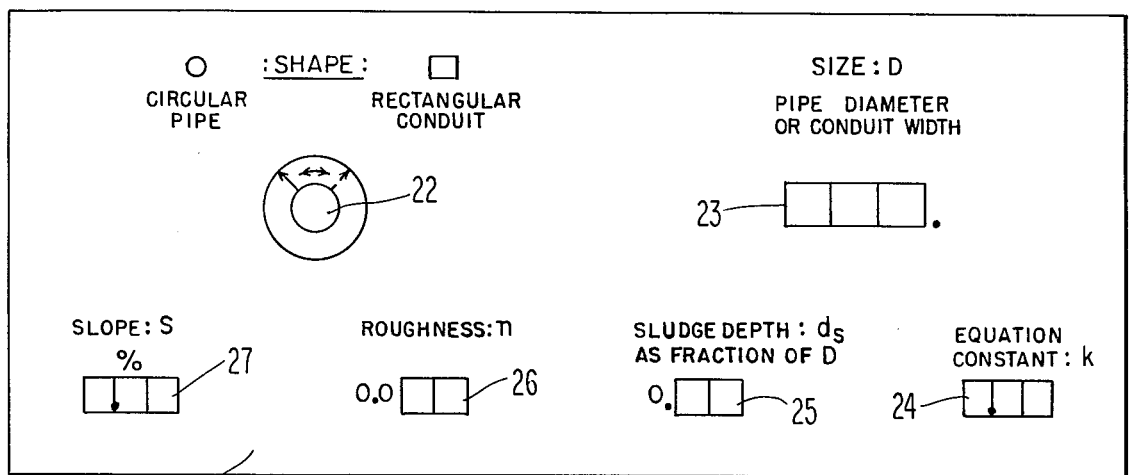
FIG. 3 is a schematic elevation of control panel components of the apparatus of FIG. 2.

FIG. 3 shows input panel 21a for Depth-to-Flow Converter 20. A half dozen controls are shown and marked on the panel. All are digital except SHAPE knob 22 at the upper left, which has a left portion (solid arrow) for circular pipe and a right position (broken arrow) for rectangular conduit. At the upper right 3-digit SIZE control 23 for D, the diameter of the pipe or the width of the conduit; dimensional units are not stated here but normally would be inches (or centimeters) with the decimal point located to the right as shown, but if desired to be feet (or meters) the decimal point would be shifted one (or two) positions to the left. Of course, the converter circuitry takes into account the unit dimensions to be used, as does 3-digit EQUATION CONSTANT: K, control 24, shown at the lower right, which is usually 1.49 when all dimensions are based upon the English unit of feet. SLUDGE DEPTH: $d_s$, if any, is inserted as a 2-digit fraction (decimal point at the left) of D in control 25. Control 26 adjusts ROUGHNESS: n, which is Manning's constant, for which usual values fall with the range of about 0.011 to 0.022 for customary pipe materials, available in hydraulics handbooks and like publications, and shown here as 0.0——, where only the last two digits need be set by the operator. At the far left, SLOPE: S control 27 is shown as a 3-digit percentage (dimensionless) with one digit left of the decimal point, customary slopes ranging from about 1 in 100 (1.00%) to about 1 in 2000 (0.05%). Thumbwheel or similar digital setting devices are suitable for inputting the digital data required on this panel. The data are characteristic of the particular site being monitored, of course.

Figure 4:
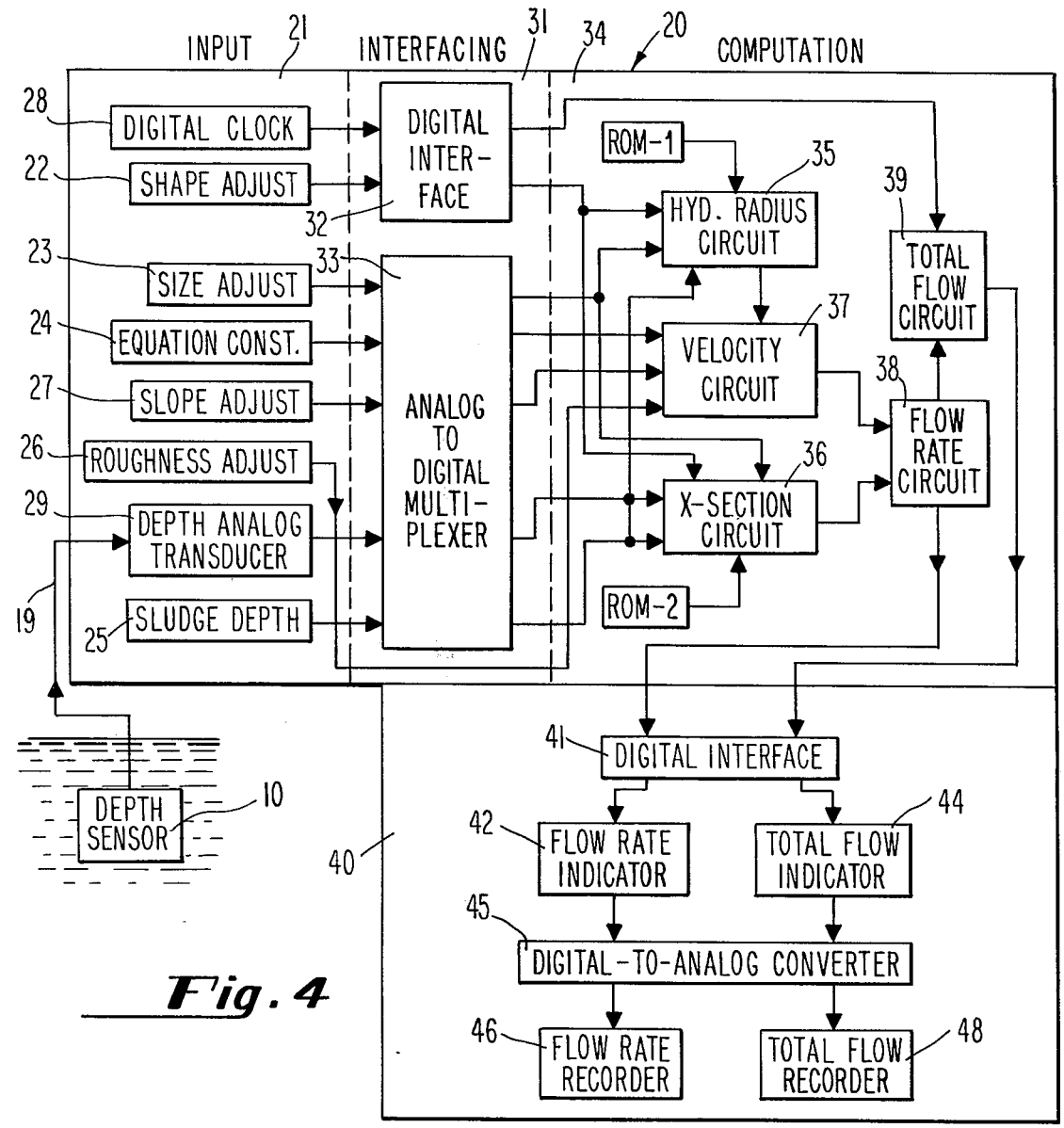
FIG. 4 is a schematic, largely block diagram of computing and related components of the apparatus of FIG. 2.

FIG. 4 shows Depth-to-Flow Converter 20 in block form fed by Depth Sensor 10 and feeding Indicator/Recorder Unit 40. The Converter comprises INPUT section 21 at the left, separated by a vertical broken line from INTERFACING section in the middle, separated by another vertical broken line from COMPUTATION section 34 at the right. It will be apparent that the INPUT section includes the CLOCK TIMING and DEPTH SENSING functions of FIG. 1 as well as having the control panel of FIG. 3 (not shown here). The DEPTH SENSING function of FIG. 1 is performed by Depth Sensor 10 shown here in block form and in more detail in FIG. 2, and the CLOCK TIMING function is performed by indicated digital clock 28. The COMPUTATION section of the Converter is designed to perform both the DEPTH-TO-FLOW CONVERSION and the FLOW TOTALIZATION functions of FIG. 1. Indicator/Recorder Unit 30 here is adapted to provide both the FLOW RATE INDICATION and the TOTAL FLOW INDICATION of FIG. 1.

The input components of section 21 (at the left in FIG. 4) include depth analog transducer 29 to change the pressure signal from the depth sensor to a depth signal in analog form. Also present are the half dozen controls from the input panel of FIG. 3, here denoted (respectively) as shape adjust 22, size adjust 23, equation const. 24, sludge depth 25, roughness adjust 26, and slope adjust 27. As indicated by arrows, the digital clock and the shape adjust, which are already digital, feed through digital interface 32 of section 31 to section 34, and the other input components reach section 34 only after passing through analog-to-digital multiplexer 33 in section 31.

The principal components of computation section 34 are hydraulic radius circuit 35, x-section circuit 36, velocity circuit 37, flow rate circuit 38, and total flow circuit 39. The radius circuit receives inputs 22, 23, 25 and 29 with the appropriate pipe (or conduit) shape, size, and sensed liquid depth data. A first read-only memory, ROM-1, provides geometric data to the radius circuit, which produces as output the corresponding hydraulic radius value raised to the $\frac{2}{3}$ power, for use in calculating flow velocity. The cross-section circuit not only receives the size, shape, and liquid depth inputs and geometric data from a second read-only memory, ROM-2 but also sludge depth input 25 and produces an output value of the liquid cross-sectional area. Tables of such ROM data are found in handbooks.

The velocity circuit receives as inputs the output of the hydraulic radius circuit plus inputs 24, 27, and 26, being appropriate values of the equation constant and of the slope (of which the circuit takes the square root) and the surface roughness of the pipe or conduit. In effect, the circuitry performs the desired multiplication and solves the equation: $V=(k/n)R^{\frac{2}{3}}S^{\frac{1}{2}}$ (Manning's formula) where V is average velocity of liquid (ft/sec),
if k is the equation constant (e.g., 1.49),
and n is the roughness value (e.g., 0.013),
R is the hydraulic radius (ft), and
S is the slope (ft/ft).

The flow equation is $Q=AV$
where

Q is instantaneous flow (cu ft/sec),
if A is cross-sectional area (sq ft),
and V is as set forth above.

(The hydraulic radius is defined as the transverse cross-sectional surface area of water divided by the perimeter wetted by that water surface.) Thus, the outputs of the cross-sectional area circuit and the velocity circuit are fed into flow rate circuit 38, which outputs the value of instantaneous flow of liquid through the pipe or conduit. Total flow circuit 39 receives such output, together with the time output from digital clock 28, and integrates the instantaneous flow over a given time period (such as a day) to give the total flow over that time period.

The instantaneous and total flow outputs from circuits 38 and 39 are fed through a digital interface in Indicator/Recorder Unit 40 and, respectively, to flow rate indicator 42 and total flow indicator 44, to appear in transitory digital form. For more long-lasting representation, the indicators may output their respective signals through analog-to-digital converter 45 to flow rate recorder 46 and total flow recorder 48, which may be of chart type. Alternatively, the digital data may be recorded directly by a suitable printer (not shown) or stored in a computer data bank.

A single embodiment has been shown and described in sufficient detail to enable a person with ordinary skill to understand the invention and to practice it, using conventional materials. No further disclosure is necessary here. However, modifications may be made. For example, although the slope and roughness inputs are set up as linear throughout the entire depth range, appropriate non-linearity can be provided, as for pipes whose wetted surface is smoother the less water there is in them, or, alternatively, that are smoother along their usually dry portion. Similarly, non-equilibrium slope curves can be built in, if desired. Minor variations in exponents should be dealt with similarly to modify the flow formula for different conditions. In general, however, the described equipment provides a maximum of advantage with a minimum of duties for the operator.

Other modifications may be made, as by adding, combining, and subdividing parts and steps, or substituting equivalents, while retaining advantages and benefits of the invention, which itself is defined in the following claims.

I claim:

1. Apparatus for monitoring gravity flow of liquid in a sewer or water pipe or conduit comprising means for measuring depth of liquid therein, means for receiving pertinent inputs and for calculating liquid flow rate therefrom, manually adjustable input component means for inputting the shape and size of the pipe or conduit and for inputting measured depth of liquid therein and for inputting values of a plurality of flow-affecting variable factors to the computation means, the latter means including circuitry for determining separately the liquid cross-section, hydraulic radius, and flow velocity, and including circuitry for calculating flow rate therefrom.

2. Apparatus according to claim 1, including means for converting a plurality of the input items from analog to digital form after being input and including means for outputting flow rate data in digital form.

3. Apparatus according to claim 2, including analog-to-digital converter means for converting the output digital flow rate data into analog form for outputting.

4. Apparatus according to claim 1, including read-only memory means storing geometric data for retrieval of liquid cross-section data given the liquid depth data and pipe or conduit data, including slope/roughness data.

5. Apparatus according to claim 4, including read-only memory means storing geometric data for retrieval of hydraulic radius data.

6. Apparatus according to claim 5, including means for calculating liquid flow velocity from the liquid cross-section and hydraulic radius data and variable factors characteristic of the pipe or conduit.

7. Apparatus for monitoring gravity flow of liquid in a sewer or water pipe or conduit comprising means for sensing depth of liquid therein and means for determining from the shape and size of the pipe or conduit and from the sensed depth therein the transverse sectional area of liquid therein, means for determining from the foregoing the hydraulic radius of the liquid therein and means for determining from the outputs of the foregoing means and from known slope and roughness of the pipe or conduit the velocity of the liquid therealong, and means for multiplying the transverse cross-sectional area and the velocity so determined and thereby determining the liquid flow.

8. Apparatus for monitoring liquid flow according to claim 7, adapted to receive sludge depth as an additional input to the means for determining cross-sectional area and hydraulic radius.

9. Apparatus for monitoring gravity flow of liquid in a sewer or water pipe or conduit comprising means for sensing depth of liquid therein, means for determining from the shape and size of the pipe or conduit and the sensed depth of liquid therein and depth of any sludge underlying the liquid therein the transverse cross-sectional surface area of liquid therein, means for determining from the shape and size of the pipe or conduit and sensed depth of liquid therein and depth of any sludge underlying the liquid therein the hydraulic radius of such liquid surface, means for applying the Manning flow formula to the resulting hydraulic radius and to the slope and inside wall roughness of the pipe or conduit to obtain the liquid flow velocity, means for multiplying the resulting liquid flow velocity by the liquid surface area to obtain the liquid flow rate, and means for indicating the resulting liquid flow rate.

* * * * *